Oct. 6, 1964

W. W. CASE 3,152,010

APPARATUS FOR APPLYING SEASONING TO POTATO CHIPS

Filed July 5, 1960

INVENTOR.
WOODROW W. CASE
BY
Woodhams Blanchard and Flynn

ATTORNEYS

Oct. 6, 1964
W. W. CASE
3,152,010
APPARATUS FOR APPLYING SEASONING TO POTATO CHIPS
Filed July 5, 1960
3 Sheets-Sheet 2
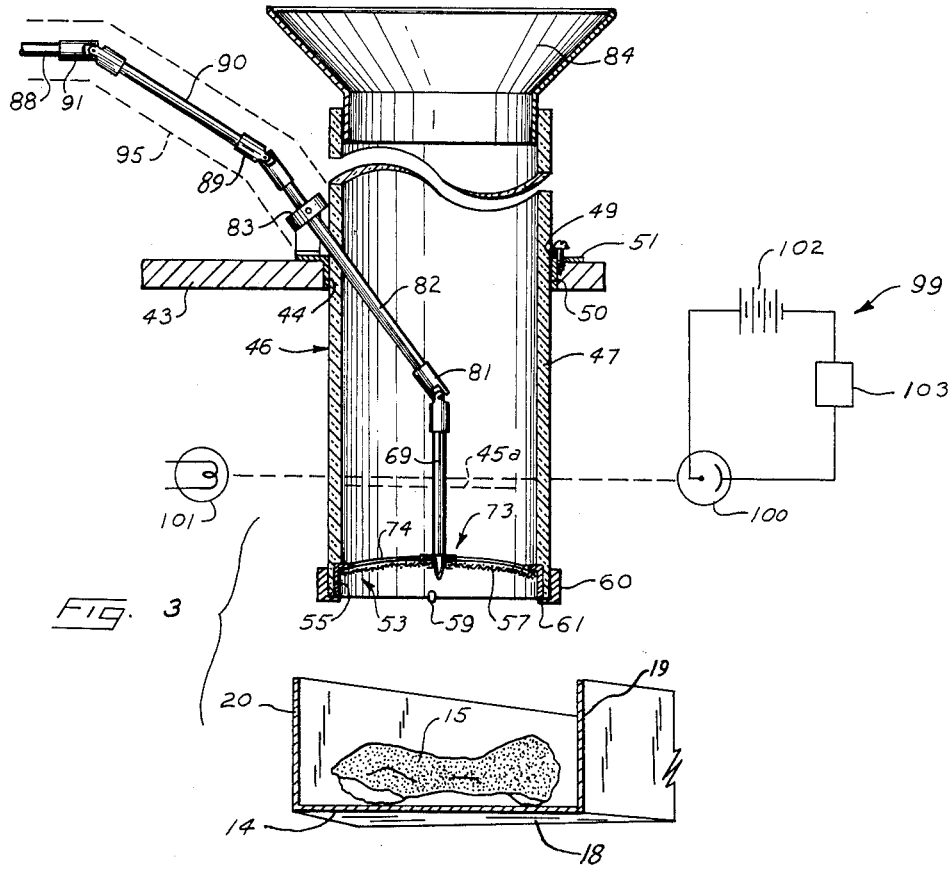
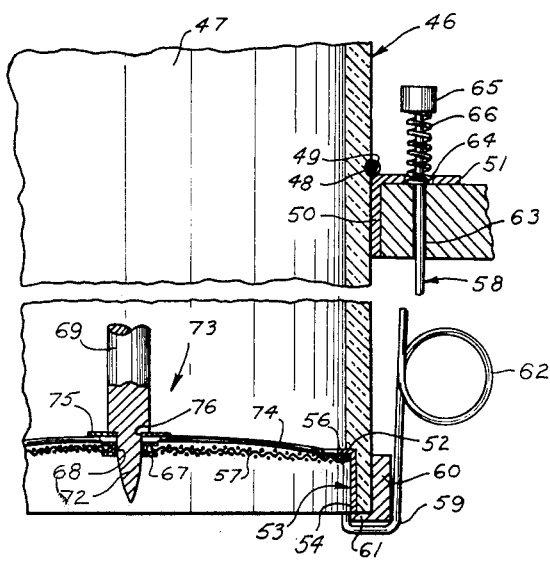
INVENTOR.
WOODROW W. CASE
BY
Woodhams Blanchard & Flynn
ATTORNEYS Oct. 6, 1964 W. W. CASE 3,152,010
APPARATUS FOR APPLYING SEASONING TO POTATO CHIPS
Filed July 5, 1960 3 Sheets-Sheet 3

INVENTOR.
WOODROW W. CASE
BY
Woodham Blanchard and Flynn
ATTORNEYS

United States Patent Office 3,152,010
Patented Oct. 6, 1964

3,152,010
APPARATUS FOR APPLYING SEASONING TO POTATO CHIPS
Woodrow W. Case, Kalamazoo, Mich., assignor, by mesne assignments, to Be-Mo Machine Company, Kalamazoo, Mich.
Filed July 5, 1960, Ser. No. 40,665
5 Claims. (Cl. 118—24)

This invention relates in general to an apparatus for applying a comminuted material to a plurality of small articles moving along a confined path and, more particularly, for applying powdered seasoning to the external surfaces of a plurality of edible chips so that said seasoning is deposited automatically and substantially uniformly upon the external surfaces thereof without interrupting the normal, existing procedures for preparing the chips.

The need has long existed for an apparatus whereby comminuted materials can be automatically and efficiently applied to edible materials. More specifically, and by way of example, manufacturers of potato chips have long desired a procedure or device whereby powdered seasoning can be applied in the proper amount upon the external surfaces of the chips without wasting the seasoning and without damaging the chips or increasing the time required to produce the unseasoned chips. The previous attempts to meet this need have resulted in rather crude structures and procedures, which have developed along two lines.

In one procedure the chips and the seasoning material have been placed in a large container or other enclosed zone and then the chips and the seasoning material have been agitated so that they are intermixed. This procedure, which has often been carried out by shaking the entire container, has given rise to two very serious problems. In the first place, it has resulted in excessive damage to the chips, thereby producing large amounts of waste materials including small pieces of broken chips and the seasoning materials adhering to the small pieces. In machines utilizing this procedure, special outlets are often provided to remove this waste material, which is thereafter discarded as unrecoverable with a costly loss in chips as well as seasoning material. Since there is little or no control over the movement of either the chips or the seasoning in this agitation procedure, excessive amounts of seasoning materials are usually placed in the container in order to ensure the deposit of some seasoning on most of the chips. As a result of this precautionary measure, some of the chips are usually seasoned too highly, some of the chips are still unseasoned and a large amount of unused seasoning becomes intermixed with the small, broken pieces of chips, which are discarded. If the agitation period is increased and less seasoning is used, then the breakage, hence waste, becomes economically prohibitive. Although this procedure has been found to be very undesirable for the reasons above given, it is still widely used simply because there is no more effective method presently available within economically acceptable limits.

In the second existing procedure, the seasoning is manually applied to the chips by means of a shaker or the like. More specifically, a large shaker containing seasoning is manually held above the chips and agitated so that the seasoning falls on the chips. This procedure has been tolerable only because it does eliminate the chips damage, but it increases substantially the cost of applying the seasoning and results in large amounts of wasted seasoning. Moreover, the application of the seasoning by this method is not only erratic, but it usually reduces substantially the output of potato chips, due to numerous work stoppages. That is, it has been difficult at best to maintain a continuous seasoning operation or to control the amount of seasoning being applied to the chips by this method, due to human fatigue and errors.

Thus, it will be seen that existing procedures and devices for applying powdered seasoning to potato chips have not been at all satisfactory, they have been very costly and, as a result, they have retarded considerably the marketing of potato chips having various, palatable and commercially acceptable seasonings thereon. The invention described herein developed as a solution to problems encountered in the seasoning of potato chips. However, it will be recognized that the substance of the apparatus involved can be applied with equal effect to similar problems in related fields.

Accordingly, a primary object of this invention has been the provision of an apparatus for applying powdered seasoning materials to potato chips whereby no damage is inflicted upon the potato chips as a result of applying the seasoning, whereby the seasoning can be applied substantially uniformly to the external surfaces of the potato chips, whereby the depositing of the seasoning upon the potato chips can be carefully and accurately controlled so that over-seasoned and/or under-seasoned chips can be avoided, and whereby any excess of seasoning material which is not applied to the chips can be recovered and reused substantially without loss.

A further object of this invention has been the provision of an apparatus, as aforesaid, which can be adapted for use on and in conjunction with existing machines for producing and/or packaging quantities of potato chips without altering, reducing or obstructing the other functions of said machine.

A further object of this invention has been provision of an apparatus, as aforesaid, which can be manufactured inexpensively, which requires a minimum of maintenance and attention during normal operation, which can be easily disconnected from an associated structure, such as a chip-packaging machine, for cleaning and which can be placed into operation and continued in such operation by any person capable of operating a machine for producing or moving potato chips.

Other objects and purposes of this invention may become apparent to persons familiar with this type of equipment upon reading the following description and examining the accompanying drawings in which:

FIGURE 3 is a sectional view taken along the line III—III in FIGURE 2 and including an electric signalling circuit.

FIGURE 4 is a sectional view taken along the line IV—IV in FIGURE 2.

Figure 1:
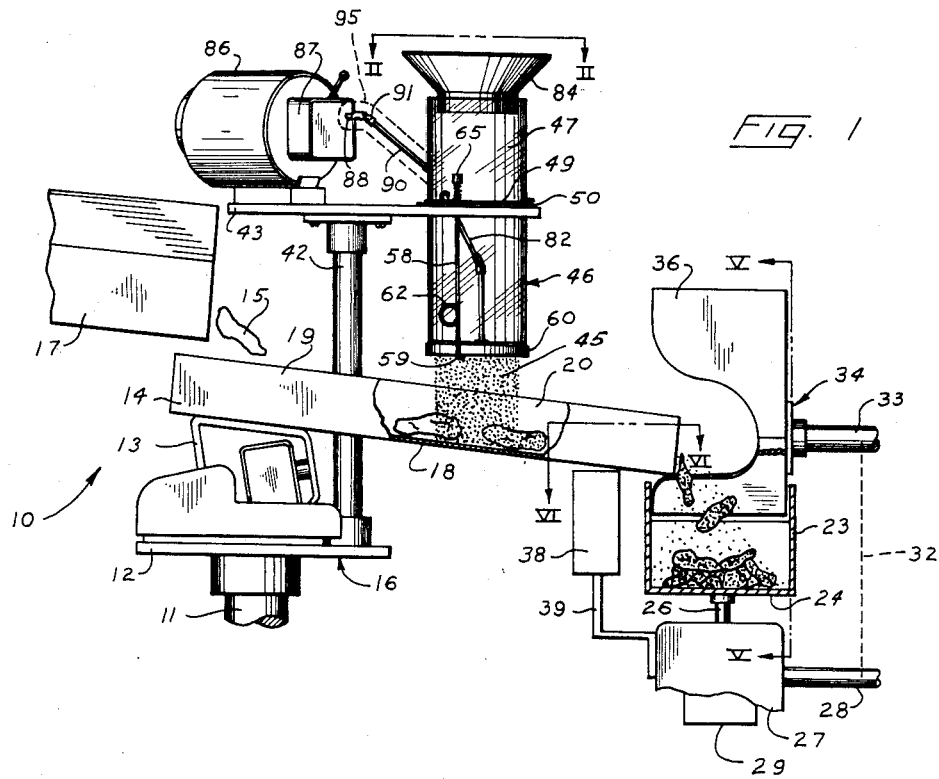
FIGURE 1 is a fragmentary, partially sectional view of a chip measuring and packaging machine including a side elevational view of an apparatus of the invention for depositing seasoning materials upon potato chips.
Figure 2:
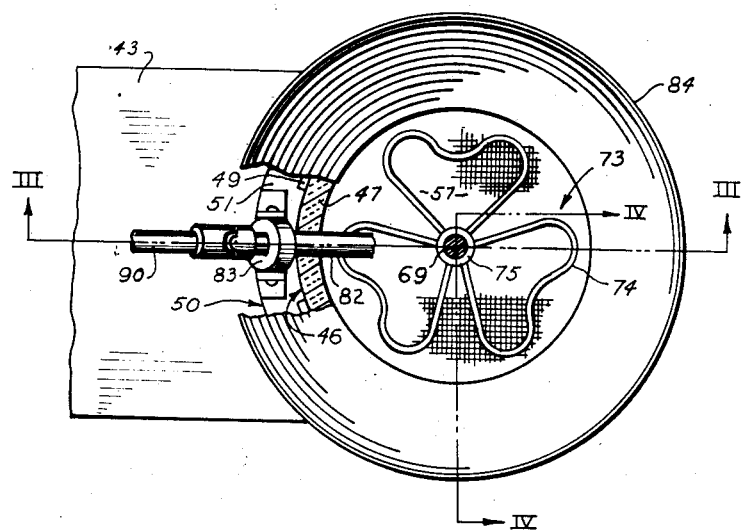
FIGURE 2 is a sectional view substantially as taken along line II—II in FIGURE 1.

For convenience in description, the terms "upper," "lower" and words of similar import will have reference to the apparatus of the invention and parts of the chip machine associated therewith in their normal position of operation, as appearing in FIGURES 1 and 2. The terms "inner," "outer" and derivatives thereof will have reference to the geometric center of said apparatus and parts thereof.

General Description

The objects and purposes of the invention, including those set forth above, have been met by providing the apparatus of the invention and having a conveyor along which the potato chips are advanced at a uniform rate of speed in a substantially continuous stream of closely spaced chips.

The apparatus of the invention is preferably used in association with a substantially horizontal conveyor mounted upon a base pedestal and arranged to advance the chips toward and into a receptacle located below one end of the conveyor. The apparatus includes a preferably transparent container having a perforate bottom wall which is supported by means of said base structure directly above and near to said conveyor, and is of sufficient size to carry an adequate supply of powdered seasoning material. Agitator means is mounted within the container adjacent the bottom wall thereof for movement whereby the seasoning material within said container is caused to move through the perforations in the bottom wall in a finely divided, uniform pattern onto the conveyor, which may be the bottom wall of a chute, or onto chips moving therealong. Drive means also supported upon said base structure is connected by linkage to said actuating means for effecting said movement thereof.

The receptacle, which may be part of a chip measuring or packaging mechanism, is disposed beneath the discharge end of the conveyor for receiving from the conveyor the chips and any excess seasoning material. The chips tend to turn over as they fall from the end of the conveyor. Thus, the discharge end of the conveyor is preferably spaced upwardly from the bottom of said receptacle a distance such that the surfaces of most of said chips, which faced downwardly on the conveyor, will face upwardly in the receptacle. Accordingly, the excess powdered material discharged from the conveyor with the chips will be deposited upon that side of the chips which was facing downwardly on the conveyor and, therefore, was not coated as the chips moved along the conveyor. In a preferred embodiment, the conveyor is an inclined chute supported by a vibratory device which causes the chips to move toward the low end of the chute.

A modified apparatus provides an increase in the efficiency of the coating, and also reduces the amount of seasoning material which is carried loosely with the potato chips into their packages, after the measuring operation is performed. This modification includes a plurality of perforations in the bottom wall of the chute between the materials depositing container and the discharge end of the chute. A device is located beneath the upstream end of said perforations for directing a gentle flow of air upwardly through such perforations. Thus, the seasoning material, which does not fall upon the chips, is caused to rise slightly above the bottom wall as it passes over the air flow. Accordingly, when a chip passes over the air flow, the seasoning entrained by the air is deposited upon the lower surfaces of the chip. The excess powdered material, not thusly applied to the lower surface of the chip, is then discharged by gravity through the downstream perforations, and collected in a container for reuse.

Detailed Construction

An apparatus embodying the invention, including associated parts of a machine for conveying and packaging selected amounts of potato chips, will be described in detail for the purpose of disclosing the preferred embodiment of the apparatus. However, it will be recognized that other apparatuses can be employed and that such other apparatuses may also come within the scope of the invention.

The fragment of a machine 10 (FIGURE 1) for conveying and packaging potato chips 15 includes a support structure 16 having an upright pedestal 11 upon the upper end of which a platform 12 is supported. A vibrator 13 is mounted upon the platform 12 and supports a channel-shaped, lower chute 14, which is preferably sloped slightly downwardly away from said vibrator, which is preferably connected to the upper end of the chute. An upper chute 17, which may also be mounted upon a vibrator (not shown) similar to the vibrator 13, preferably slopes downwardly toward the upper end of the lower chute 14 into which said upper chute discharges. The two chutes are preferably independent.

The lower chute 14 (FIGURES 1 and 2) has a bottom wall 18 and a pair of spaced side walls 19 and 20 which extend upwardly from the opposite lengthwise edges of the bottom wall 18. The lower end of the lower chute 14 discharges into a receptacle 23 (FIGURES 1 and 5) having an upwardly opening, concave bottom wall 24 curving around an axis substantially parallel with the lengthwise extent of the lower chute 14. The receptacle 23 is mounted upon a post 26 which is part of a weight measuring device 27 having a sidewardly extending shaft 28. The shaft 28 is driven by mechanism 29 within the device 27 in response to selected downward movement of the post 26. The shaft is connected by a conventional drive, indicated by broken lines at 32, to an impeller shaft 33, which supports an impeller 34 having three uniformly spaced, radially extending blades 36. The shaft 33 is concentric with the upper surface of the concave wall 24 in the receptacle 23. The blades 36 are preferably arranged so that they sweep the bottom wall 24 which preferably has a circumferential length slightly less than the circumferential distance between the tips of two successive blades.

Figure 5:
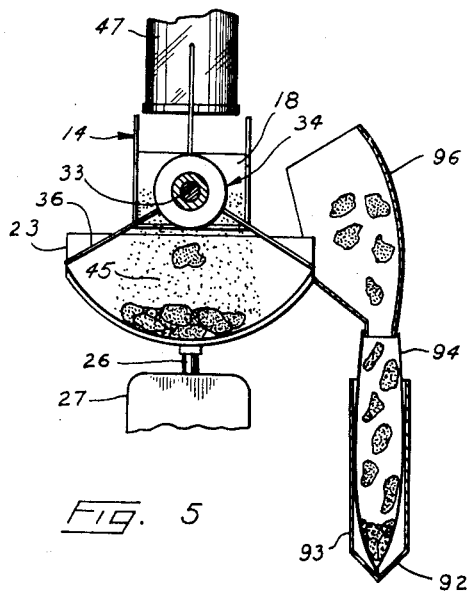
FIGURE 5 is a sectional view taken along the line V—V in FIGURE 1.

The shaft-rotating mechanism 29 (FIGURE 5) is preferably arranged so that the impeller shaft 33 will rotate one-third of a revolution in response to each complete depression of the post 26, starting with the blades 36 in the positions shown in FIGURE 5. It has been found that the chips tend to turn over as they fall from the discharge end of the chute 14. Thus, the bottom wall 24 of the receptacle 23 is intentionally and carefully spaced downwardly from the discharge end of the chute 14 so that most of the chips discharged therefrom will turn over as they fall from the chute 14, and they will be substantially upside down in the receptacle 23. That is, the surfaces of most of the chips which face downwardly in the chute 14 will face upwardly in the receptacle. It follows that the spacing from the chute 14 to the receptacle 23 will vary depending upon certain factors, such as the size, density and shape of the article or chip which is being coated. In the coating of potato chips having an average width of about two inches, a vertical spacing of about five inches was found to result in the desired turning over of most of the chips. Because the receptacle moves downwardly under the load of the chips, this spacing tends to remain the same as the chips begin to pile up in the receptacle.

Figure 6:
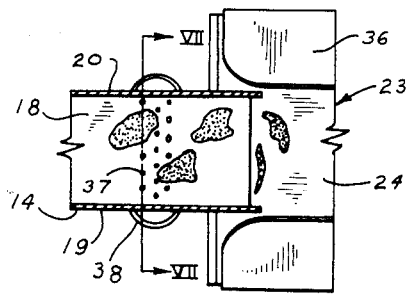
FIGURE 6 is a sectional view taken along the line VI—VI in FIGURE 1 and showing a modified construction.

The bottom wall 18 of the chute 14 (FIGURE 6) preferably has a plurality of opening 37 which, in this particular embodiment, are aligned in rows transversely of said chute for reasons appearing hereinafter. However, it will become apparent that the particular arrangement of said openings 37 may be varied, if desired or more convenient. A container 38, which may be supported upon the weight-measuring device 27 by the bracket 39, is located below the chute 14 so that it will receive any materials moving by gravity through the openings 37.

An upright post 42 is mounted upon the platform 12 and supports on its upper end a plate 43 (FIGURE 1) having a preferably circular hopper opening 44 (FIGURE 3) therethrough. A hopper 46 (FIGURE 1), which can be filled with powdered seasoning 45, is supported by the plate 43. The hopper includes a barrel 47 which is preferably, but not necessarily, fabricated from transparent materials, such as glass or plastics, and which has an annular groove 48 (FIGURE 4) between its ends for snug reception of a snap ring 49. A flanged collar 50 is slidably receivable through the opening 44 in said plate 43. The collar 50 has a radial flange 51 which rests upon the upper surface of the plate 43 and engages the snap ring 49 for the purpose of supporting the barrel 47, which is slidably received through said collar.

The lower end of the barrel 47 has a short counterbore 55 terminating in the shoulder 52 at the upper end thereof. A closure member 53 (FIGURES 2 and 4) is removably disposed within the counterbore 55 and is comprised of a substantially cylindrical rim 54 having an annular, inwardly extending flange 56 around its upper edge. A perforate sheet 57, such as a circular sheet of wire cloth, is secured to the flange 56, as by welding or crimping, and provides the bottom wall for the hopper 46. The lower edge of the rim 54 is preferably adjacent the lower edge of the barrel 47 when the flange 56 is against the shoulder 52. A retaining ring 60 is sleeved upon the lower end of the barrel 47 and has a radially inwardly extending, annular flange 61 which engages the lower edges of the barrel 47 and the rim 54.

The retaining ring 60 and the closure member 53 (FIGURE 4) are held in position at the bottom of the barrel 47 by a plurality of elongated clamp members 58, which are supported upon the plate 43 and which removably engage the retaining ring 60. Each clamp member 58 is preferably fabricated from a length of resiliently flexible material, such as steel wire, which is bent at its lower end to form an integral hook 59 extendable around the flange 61 on the ring 60. The member 58 is bent between its ends to provide a loop 62 into which a finger can be inserted for disengaging the hook 59 from the ring 60. The upper portion of the member 58 extends through an opening 63 in the plate 43 and an aligned opening 64 of larger diameter in the flange 51 on the collar 50. The upper end of the member 58, which extends above the flange 51, is rigidly engaged by a removable locking collar 65. A spiral spring 66 is sleeved upon the upper portion of the member 58 between the collar 65 and the plate 43, the lower end of the spring 66 being disposed within the opening 64 of the flange 51 to position the spring.

A metal grommet 67 (FIGURE 4), which is secured within a central opening in the perforate sheet 57, has a pivot opening 68 therethrough. An agitator 73 (FIGURES 2 and 4), which is located adjacent the bottom wall 57 of the hopper 46, is mounted upon the lower end of the agitator shaft 69. The agitator 73 is comprised of a flat ring 75 and a plurality, here three, of heart-shaped lobes 74 secured to, and extending radially outwardly from, said ring 75 at uniform intervals around said ring. The lower end of the shaft 69 has an integral, coaxial pivot pin 72 of reduced diameter which extends snugly through the central opening 76 in the flat ring 75, and beyond the lower surface thereof. The shaft 69 is secured to the ring 75, as by welding, and the pin 72 is slidably and rotatably receivable into the pivot opening 68 in the grommet 67. Thus, the closure member 53 can be removed from the barrel 47, for the purpose of cleaning it or replacing it with another closure member having a different mesh size, without disturbing the agitator 73.

The upper end of the agitator shaft 69 (FIGURE 3) is connected by a universal joint 81 to the lower end of a connecting shaft 82, which extends upwardly and outwardly through the barrel 47 near the upper edge thereof. Said shaft 82 is rotatably supported between its ends within a bearing 83 mounted upon the flange 51 adjacent the plate 43. An upwardly expanding funnel 84 is removably supported upon and partially within the upper end of the barrel 47.

A motor 86 (FIGURE 1) is mounted upon the plate 43 and its armature is connected through a speed control device 87, such as a variable speed gear box, to an output shaft 88. A further shaft 90 is coupled with and between the connecting shaft 82 and the output shaft 88 by universal joints 89 and 91 (FIGURE 3), respectively. Accordingly, rotation of the motor 86 operates through the speed control 87 and the shafts 88, 90, 82 and 69 to rotate the agitator 73. This causes a supply of comminuted material, such as powdered seasoning, disposed within the hopper 46 to be discharged through the perforations in the sheet 57 in a finely divided, uniformly disbursed pattern upon the bottom wall 18, or chips 15 disposed thereon. An enclosure, which is indicated in broken lines at 95 in FIGURE 1, may be provided around the parts of the shafts 88, 90 and 82 between the speed control 87 and barrel 47 for safety reasons.

A packaging device 92 (FIGURE 5), including a carrier 93 for a bag 94 and a funnel 96 directed toward the carrier 93, may be associated with the weight measuring device 27 for receiving selected amounts of chips 15 discharged from the receptacle 23 by the impeller 34.

If desired, a signaling device 99 may be provided in association with the hopper 46 (FIGURE 3) for the purpose of indicating when the level of powdered seasoning, indicated by the broken line 45a, has reached a point where the hopper should be reloaded. In this particular instance, the signaling device 99 includes a photoelectric cell 100 located on one side of the transparent hopper barrel 47, and a light source 101 located on the opposite side of the hopper barrel 47 and focused on the photoelectric cell through the hopper barrel. Said photoelectric cell can be connected in series with a source of energy 102 and a signaling member 103, such as a bell, a flashing light or the like. The photoelectric cell, can also be connected to switch means (not shown) for deenergizing the vibrator 13 and thereby stopping the advancement of the chips.

*Operation*

Under normal operating conditions, potato chips 15 (FIGURE 1) are advanced along the upper chute 17 and discharged into the lower chute 14 along which they are also advanced in a continuous, closely spaced stream until they are discharged into the receptacle 23. The advancement of the chips along the chutes 17 and 14 is effected in this particular embodiment by mechanism, including the vibrator 13 supporting the chute 14, which imparts to such chutes a vibratory motion in a well-known manner. The chutes 14 and 17 are preferably inclined slightly in the direction of said advancement to facilitate the movement of the chips 15, as well as the powdered seasoning 45 which is deposited into the chute 14.

The powdered seasoning 45 (FIGURE 1) is placed in the hopper 46 and caused to move through the perforate sheet 57 (FIGURE 2) in a finely divided and uniformly distributed pattern by rotating the agitator 73. The agitator is rotated by the motor 86, which operates through the shafts 88, 90, 82 and 69. The speed of rotation of the agitator 73, hence the volume of powdered material discharged through the perforate sheet 57, may be varied by the speed control 87, which connects the armature of the motor 86 to the output shaft 88. The perforations in the sheet 57 are selected so that very little or no powdered seasoning will normally move therethrough unless the agitator 73 is rotated. It will be apparent that for powdered seasoning of different particle sizes and textures, it may be desirable to use perforate sheets 57 having perforations of corresponding sizes.

As the chips 15 move along the lower chute 14 beneath the hopper 46 (FIGURE 1) the powdered seasoning 45 will be deposited either upon the upper surfaces of said chips or upon the bottom wall 18 of the chute 14 and move downwardly therealong with the chips. Part of the excess powdered seasoning moving along the wall 18 will pass through the openings 37 (FIGURE 6) in the bottom wall 18 and will be collected in the container 38. The remainder of the powdered seasoning will be discharged from the lower, downstream end of the chute 14 with the chips 15 into the receptacle 23. As stated above, the chips will normally tumble and turn over as they drop from the chute 14 into the receptacle 23. Thus, by properly spacing the receptacle from the chute 14, the powdered seasoning dropping with the chips will be deposited upon the side of any given chip which faced downwardly in the chute 14 and, therefore, was not coated as it moved under the hopper 46. It has been found that by careful control of the amount of powdered material deposited by the hopper 46 and the amount of the excess material removed through the openings 37 in the chute 14, very acceptable coating of the chips on both sides can be effected by the apparatus and the procedure as set forth above, without wasting the seasoning material.

As the chips fall into the receptacle 23, their weight causes the receptacle and the post 26 supporting said receptacle to move downwardly until the shaft rotating mechanism 29 is energized to effect rotation of the shaft 28. Forthwith, the potato chips disposed within the receptacle 23 are moved by the impeller 34 into the guiding funnel 96 (FIGURE 5) and thence into a bag 94 supported by the packing device 92.

Modified Construction

Figure 7:
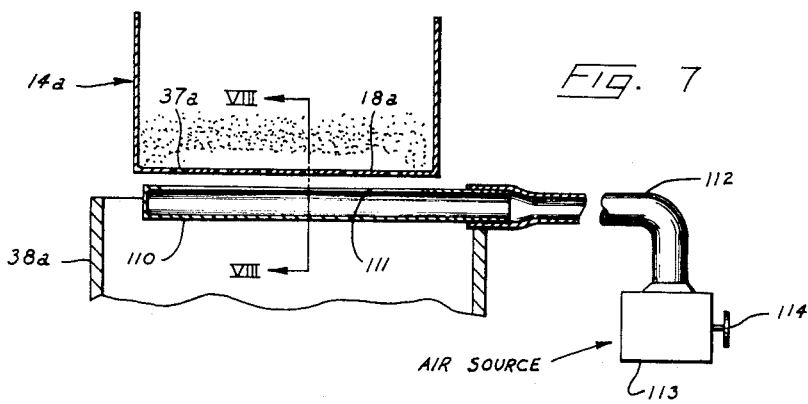
FIGURE 7 is a sectional view taken along the line VII—VII in FIGURE 6.
Figure 8:
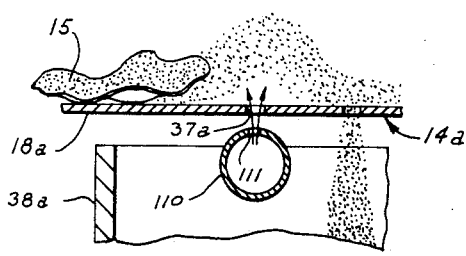
FIGURE 8 is a sectional view taken along the line VIII—VIII in FIGURE 7.

Under some circumstances, it may be desirable to increase the application of the seasoning materials to the lower sides of the chips in order to obtain a more complete coating. This can be accomplished, as shown in FIGURES 7 and 8, by causing a small, controlled amount of air to move upwardly in a gentle stream through the openings 37a in the bottom wall 18a of the chute 14a. When the powdered materials pass over such air stream, they are entrained therein and moved upwardly a short distance. This air stream may be created by providing a discharge tube 110 adjacent to, and transversely of, the lower surface of the bottom wall 18a beneath the upstream end of the openings 37a. The tube 110 has an elongated, upwardly opening slit 111 in its upper surface vertically aligned with and directly below the first, upstream line of openings 37a over which the powdered material passes, as it moves downwardly along the chute 14a. The tube 110 is connected by a conduit 112 to a source 113 of air under pressure, such source being provided with a control 114 for increasing or decreasing the air flow through the slit 111.

By placing the tube 110 beneath the upstream line of openings 37a, the excess amount of powdered material, which is not deposited upon the chips, can drop through the downstream openings into the container 38a in the manner set forth above with respect to the structure shown in FIGURE 1. As shown in FIGURE 8, the powdered material is raised by the air stream passing through the slit 111 and the openings 37a just enough to be intercepted by the lower surfaces of the chips 15 as they pass over the slit 111. This positive application of the powdered seasoning to the lower surfaces of the chips by the air flow from the tube 110 may be augmented by the depositing of additional seasoning on the chips as they drop with such seasoning from the chute 14a, as described above. However, the air flow application of seasoning may also be entirely adequate by itself, so that all of the excess powdered material can pass through the downstream openings 37a and be recovered. This can be easily encouraged by enlarging somewhat the downstream openings 37a. Thus, the tube 110 may serve either to augment or to modify the operation of the structure disclosed in FIGURE 1.

Although particular, preferred embodiments of the invention have been disclosed above for illustrative purposes, it will be understood that variations or modification of such disclosure, which lie within the scope of the appended claims, are fully contemplated.

What is claimed is:

1. An apparatus for applying powdered seasoning to edible chips and the like, comprising:
   a conveyor including drive means for advancing the chips along a continuous, substantially horizontal path toward one end thereof;
   a substantially cylindrical hopper mounted directly above, closely spaced from and disposed between the ends of said conveyor so that the chips traveling along the conveyor pass directly below said hopper and relatively close thereto, said hopper having a perforate bottom wall mounted thereon;
   an agitator having a driven shaft concentrically disposed within said hopper and lobe means extending radially from said shaft adjacent the upper surface of said bottom wall;
   drive means including a drive shaft extending through the side wall of said hopper and connect to said driven shaft for rotating same, so that powdered seasoning in said hopper is discharged by said agitator through said perforate bottom wall in a steady stream of finely and substantially uniformly dispersed particles, the space between said bottom wall and said conveyor being unobstructed so that said stream of seasoning can fall directly onto the upper surfaces of the chips moving along the conveyor and onto the conveyor without disturbance of the chips;
   a receptacle disposed adjacent to and directly below said one end of said conveyor, the path between said one end of said conveyor and said receptacle being unobstructed so that the chips freely fall vertically from said conveyor into said receptacle, the bottom of said receptcle being spaced downwardly from said chute a distance substantially in excess of, and dependent upon the average width of, the chips, such that most of the chips turn over once as they fall through said vertical path and come to rest with the lower surfaces of said chips facing upwardly, so that the particles on said conveyor will fall from said one end thereof with said chips onto said lower surfaces thereof.

2. An apparatus according to claim 1 in which said receptacle means is mounted for vertical movement with respect to said one end of said conveyor in response to the weight of the chips accumulated therein, whereby the distance said chips fall will tend to remain substantially constant during the accumulation of the chips in said receptacle means.

3. An apparatus according to claim 1, including impeller means movable through said receptacle for engaging and moving the chips therein through one end of said receptacle when a predetermined weight of chips has been accumulated therein;
   a funnel adjacent to said one end of said receptacle for receiving the chips discharged from the receptacle, and a bag holding device associated with said funnel whereby the chips can be placed in a bag held in said bag holding device.

4. An apparatus according to claim 1, wherein said conveyor consists of a single, inclined chute having a continuous lower wall along which the chips travel, said lower wall being non-perforate directly below said hopper;
   means defining a plurality of perforations through said lower wall arranged in a group between the area of said lower wall below said hopper and the one end of said chute, whereby a selectable portion of the seasoning which falls onto said chute can be removed therefrom as it moves along said chute with said chips from said area below said hopper to said one end of said chute; and
   a container below said perforations in said lower wall for receiving said portion of seasoning.

5. The apparatus of claim 1 including a plurality of transversely aligned openings through the bottom wall of said conveyor, said openings being arranged in rows transverse of said conveyor between said one end thereof and said hopper; a container beneath said openings; a plenum disposed beneath said conveyor and having an elongated, narrow opening through the upper side thereof adjacent to and directly below the first line of openings nearest said hopper; a source of gas under pressure and conduit means connecting said source to said plenum, a selected amount of gas being expelled through said narrow opening and said first line of openings, whereby said powdered seasoning passing over said first line of openings is raised a short distance from said bottom wall and is thereby applied to the downwardly facing surfaces of said chips as they pass over said first line of openings.

References Cited in the file of this patent

UNITED STATES PATENTS

| | | |
|---|---|---|
| 1,110,383 | Flanagan | Sept. 15, 1914 |
| 1,269,777 | Bates | June 18, 1918 |
| 1,664,474 | Bailey | Apr. 3, 1928 |
| 1,801,572 | Salerno | Apr. 21, 1931 |
| 1,913,868 | Andreas | June 13, 1933 |
| 2,183,026 | Mason | Dec. 12, 1939 |
| 2,184,085 | Ruetz | Dec. 19, 1939 |
| 2,347,164 | Petrilli | Apr. 18, 1944 |
| 2,381,505 | Lindholm | Aug. 7, 1945 |
| 2,394,476 | Pipping | Feb. 5, 1946 |
| 2,716,608 | Renish | Aug. 30, 1955 |
| 2,726,597 | Luke | Dec. 13, 1955 |
| 2,731,942 | Anderson | Jan. 24, 1956 |
| 2,845,040 | Ray | July 29, 1958 |
| 2,893,332 | Roser et al. | July 7, 1959 |
| 2,909,435 | Watters et al. | Oct. 20, 1959 |

FOREIGN PATENTS

| | | |
|---|---|---|
| 321,131 | Germany | May 25, 1920 |
| 248,473 | Switzerland | Feb. 2, 1948 |
| 566,742 | Canada | Dec. 2, 1958 |